No. 680,051. Patented Aug. 6, 1901.
C. LUETEKE.
BREAD OR CANDY DIVIDING MACHINE.
(Application filed Jan. 15, 1901.)
(No Model.)
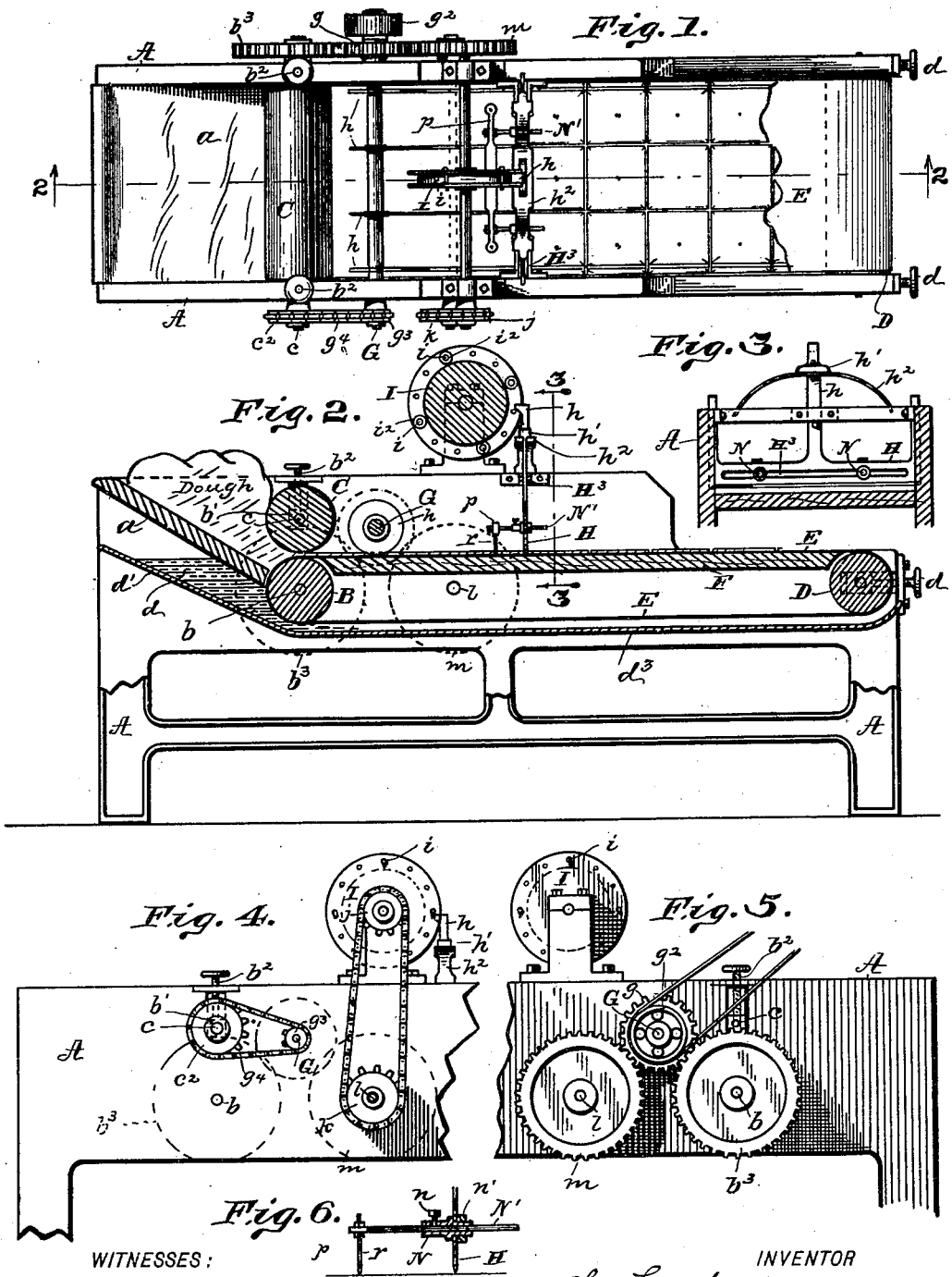
WITNESSES:
F. W. Woerner
S. Mahlon Unger
INVENTOR
Chas Lueteke
BY Jos. A. Minturn
ATTORNEY

UNITED STATES PATENT OFFICE.

CHARLES LUETEKE, OF GREENCASTLE, INDIANA.

BREAD OR CANDY DIVIDING MACHINE.

SPECIFICATION forming part of Letters Patent No. 680,051, dated August 6, 1901.

Application filed January 15, 1901. Serial No. 43,316. (No model.)

*To all whom it may concern:*

Be it known that I, CHARLES LUETEKE, a citizen of the United States, residing at Greencastle, in the county of Putnam and State of Indiana, have invented certain new and useful Improvements in Bread or Candy Dividing Machines, of which the following is a specification.

This invention relates to improvements in machines for rolling bread, cake, and candy dough into thin sheets and cutting said sheets into strips and cakes, the object being to provide a machine with adjustable mechanism whereby variations in the thickness of the sheets may be obtained and whereby the dimensions of the divided parts can be regulated.

The invention is applicable to the forming of all sizes of bread, rolls, biscuit, crackers, cakes, pretzels, caramels, cocoanut sticks, cream bar, horehound sticks, and other candy, and to other purposes where a doughy or plastic material is to be divided.

I accomplish the object of the invention by the mechanism illustrated in the accompanying drawings, in which—

Figure 1 is a plan view of my invention; Fig. 2, a vertical section on the dotted line 2 2 of Fig. 1; Fig. 3, a detail in vertical section on the line 3 3 of Fig. 2 of the part between the arrows at ends of said dotted line; Fig. 4, a detail in side elevation of the right side of the front end of the machine; Fig. 5, a like detail of the opposite or left side of the front end of the machine; and Fig. 6, a detail in vertical section of the reciprocating cutter, showing docker attached thereto.

Like letters of reference indicate like parts throughout the several views of the drawings.

A represents the frame or body of the machine, having a slide $a$ at its front end, inclined to the horizontal, upon and down which the mass of dough to be rolled and divided is placed. At the bottom of this incline are the two rollers B and C. The lower roller B is mounted on the non-adjustable shaft $b$, and the roller C is mounted on the shaft $c$, which is adjustably mounted in direct vertical alinement above the shaft $b$ in boxes $b'$, which are raised and lowered by means of the screws $b^2$. By means of the screws the top roll can be placed at a greater or less distance from the bottom one and the thickness of the sheet of dough rolled out between them regulated. In approximately the same horizontal plane, but at the opposite end of the machine, is the roller D, having a shaft mounted in boxes, which are adjustable by means of the screws $d$, whereby the distance between the rolls B and D can be changed. Passing around the rolls B and D is the endless belt or apron E. This apron runs over the top of the table F, and as it makes the turn around the front roll B it is brought in contact with a mass of flour $d$, contained between the incline $a$ and the incline $d'$. The sheet of dough as it comes from between the rolls B and C is deposited upon the apron E, and the apron is kept well floured by contact with the flour mass $d$ to keep the dough from adhering to said apron. The apron is made to travel by the rotation of the rollers around which it passes in the manner which will be presently described. Connected with the incline $d'$ is the pan $d^3$ to catch the droppings of flour from the inverted apron and save it clean for further use. The apron is kept taut by adjusting the roller D.

G is the main driving-shaft of the machine. It has the spur-gear $g$, which meshes with the spur-gear $b^3$ on the shaft $b$. It also has on the same end the pulley $g^2$, which is driven by belt connection with any suitable source of power, or, if preferred, the shaft may be provided with a crank and turned by hand. The opposite end of shaft G from gear $g$ has the sprocket-wheel $g^3$, which connects by chain belt $g^4$ with sprocket-wheel $c^2$ on the adjacent end of the shaft $c$. By this means the upper and lower rollers are positively driven, and the rotation of the roller B causes the belt or apron to be correspondingly moved.

Mounted on the shaft G are the circular cutters $h$, which latter are adjustable on the shaft, whereby the distance between them may be varied, according to the thickness or width of the strips of dough required to be cut, it being the purpose of the cutters to enter the sheet of dough as the latter passes on the apron or belt under them and cut it longitudinally into strips. It now remains to cut the strips transversely into cakes, and this is accomplished by means of the vertically-reciprocating knife H, which works in suitable guides in the frame of the machine and has the central standard $h$, with stop $h'$, against which a semi-elliptic spring $h^2$ bears. The spring is slotted to allow the standard to pass through it. The downwardly-extended ends enter a slot in the top of a cross-bar $H^3$. The action of the spring tends to hold the knife in an elevated position. The lowering of the knife to make the cut is accomplished in the following manner: Located adjacent to the standard $h$ is the wheel I, having double flanges which form a central groove into which the upper end of the standard enters, and supported by the flanges are the cross-bolts $i$, which when the wheel I is rotated contact with the top of the standard and lower same, causing it to lower the attached knife and cut the strips of dough. To make the friction between the bolts and standard less, I prefer to surround the bolts with the rollers $i^2$. (Shown in Fig. 2.) A number of bolt-holes are provided through the flanges, as shown in the drawings, whereby the positions of the bolts may be varied, thereby varying the distances between the cuts in the dough. If a greater number of strokes of the knife is desired at each revolution of the wheel I, more bolts will be used and the spaces made equal between them, or if a less number of strokes is desired some of the bolts now shown in the drawings will be removed and the spaces made equal, although if it is desired to make some wide and some narrower cakes the result may be accomplished by varying the spaces between the bolts.

The wheel I is driven by belting the sprocket-wheel $j$ on the end of its shaft with the sprocket-wheel $k$ on the shaft $l$. The shaft $l$ is connected by spur-gear $m$ with the spur-gear $g$ on shaft G.

The knife H has the longitudinal slot $H^3$ to receive the laterally-adjustable holders N, with central perforation to receive the rods or docker-holder N'. These rods are adjustable longitudinally in the holders and are held by set-screws $n$. The shanks of holders N are threaded to receive the threaded nuts $n'$, whereby the holders are bolted to the knife H. The rods are connected with the cross-bar $p$, which carries the pins $r$ to puncture the dough.

Having thus fully described my invention, what I claim as new, and wish to secure by Letters Patent of the United States, is—

1. In a machine for molding and dividing bread, cakes, candy, &c., the combination of a table, a pair of feed-rollers located at one end of the table, the lower roller having its upper surface about flush with the top of the table, a rotary cutter located above the table in the rear of the feed-rollers for cutting the dough into strips longitudinally, an endless carrier passing between the feed-rollers and between the rotary cutter and the table, a vertically-reciprocating knife transverse to the table and held normally away from the table by a spring said knife having a standard and a rotating wheel with strikes to contact with the standard and depress the knife, substantially as described and shown.

2. A table, an endless carrier passing over the table, a rotary cutter located above the table in close relation to cut such material as may be carried past it by the endless carrier, and a knife transverse to the table and carrier having reciprocating movement to and from the table, said knife being pressed normally away from the table by a spring, a standard connected with the knife and a wheel rotating in close proximity to the standard and having strikes to contact with the standard and depress it and the knife, substantially as described and shown.

3. A table, a rotary cutter located above the table in close relation thereto, an endless carrier passing over the table between it and the rotary cutter, a vertically-reciprocating knife transverse to the table pressed upwardly by a spring, said knife having a standard, and a wheel rotating adjacent to the standard and having a series of adjustable strikes adapted to contact with the standard and depress same thereby lowering the knife, substantially as described and shown.

4. A table, a rotary cutter located above the table in close relation thereto, an endless carrier passing over the table between it and the rotary cutter, a vertically-reciprocating knife transverse to the table pressed upwardly by a spring, said knife having a standard, and a wheel rotating adjacent to the standard and having a double flange forming a groove into which the end of the standard takes, said flanges having a series of perforations to receive bolts to form strikes to depress the standard and knife, bolts removably secured in some or all of said perforations, all substantially as described and shown.

5. A table, a rotary cutter above the table in close relation thereto, an endless carrier passing over the table between it and the rotary cutter, a vertically-reciprocating knife transverse to the table pressed upwardly by a spring, said knife having a standard, and a wheel rotating adjacent to the standard and having a plurality of strikes adjustable with relation to their distances from each other, said strikes being adapted to contact with the standard and depress it and the knife and dockers secured to and moving with the knife, substantially as described and shown.

In witness whereof I have hereunto set my hand and seal, at Greencastle, Indiana, this 22d day of December, A. D. 1900.

CHARLES LUETEKE. [L. S.]

Witnesses:
B. F. CORWIN,
ROSE A. GAINER.